US012711461B1

(12) United States Patent
Wang

(10) Patent No.: US 12,711,461 B1
(45) Date of Patent: Aug. 18, 2026

(54) CLOUD-BASED COLLABORATIVE DEVELOPMENT SYSTEM AND METHOD

(71) Applicant: KopherBit Co., Ltd., Hsinchu County (TW)

(72) Inventor: Yung-Chen Wang, Hsinchu County (TW)

(73) Assignee: KOPHERBIT CO., LTD., Hsinchu County (TW)

( * ) Notice: Subject to any disclaimer, the term of this patent is extended or adjusted under 35 U.S.C. 154(b) by 0 days.

(21) Appl. No.: 19/219,797

(22) Filed: May 27, 2025

(30) Foreign Application Priority Data

Apr. 18, 2025 (TW) ................................ 114114857

(51) Int. Cl.
*G06F 8/65* (2018.01)
*G06F 8/41* (2018.01)
*G06Q 10/101* (2023.01)
*H04L 65/403* (2022.01)

(52) U.S. Cl.
CPC ............ *G06Q 10/101* (2013.01); *G06F 8/41* (2013.01); *G06F 8/65* (2013.01); *H04L 65/403* (2013.01)

(58) Field of Classification Search
None
See application file for complete search history.

(56) References Cited

U.S. PATENT DOCUMENTS 11,023,834 B2 6/2021 Moolman
2017/0048339 A1* 2/2017 Straub ................ G06F 16/2379
2019/0213104 A1* 7/2019 Qadri .................. H04L 67/1097
2023/0062521 A1* 3/2023 Jones .................. H04L 63/0892
2024/0103850 A1* 3/2024 Pierce ...................... G06F 8/34

FOREIGN PATENT DOCUMENTS

EP 3889714 A1 10/2021

OTHER PUBLICATIONS

J. Hausladen, B. Pohn and M. Horauer, "A cloud-based integrated development environment for embedded systems," 2014 IEEE/ASME 10th International Conference on Mechatronic and Embedded Systems and Applications (MESA), Senigallia, Italy, 2014, pp. 1-5, doi: 10.1109/MESA.2014.6935577. (Year: 2014).*
J. L. Reed and A. S. Tosun, "BULWARK: A Framework to Store IoT Data in User Accounts," in IEEE Access, vol. 10, pp. 15619-15634, 2022, doi: 10.1109/ACCESS.2022.3144913. (Year: 2022).*

* cited by examiner

*Primary Examiner* — Laura Yesildag
(74) *Attorney, Agent, or Firm* — WPAT, PC

(57) ABSTRACT

A cloud-based collaborative development system and method. The system includes: an integrated development environment (IDE) cloud server, a resource dispatch module, a model database, a verification backend, and a data exchange bus. The method includes the steps of: predefining extensible communication protocols and exchanging data over Ethernet; using a user interface (UI) to perform software development and parameter configuration; generating a software code based on the parameter configuration; compiling an executable file; writing a test case from a remote device through a remote browser or a client application; performing closed-loop verification on the executable file based on a model; and outputting a verification report and performing version management.

6 Claims, 3 Drawing Sheets

CLOUD-BASED COLLABORATIVE DEVELOPMENT SYSTEM AND METHOD

CROSS REFERENCE TO RELATED APPLICATION

This application claims the benefits of Taiwan application Serial No. 114114857, filed on Apr. 18, 2025, the disclosures of which are incorporated by references herein in its entirety.

TECHNICAL FIELD

The present disclosure relates to cloud-based software development technology and, more particularly, to a system and a method for cloud-based collaborative development.

BACKGROUND

Currently, the development of automotive controllers and other embedded systems involves tools and processes from multiple vendors. It is difficult to seamlessly integrate these different tools, resulting in low development efficiency. In addition, current hardware development processes typically require developers to deploy complex environments in laboratories, including hardware configuration, software compilation tools, as well as simulation and testing environments for hardware-in-the-loop (HIL) testing. Many teams adopt a distributed approach to development, where each team member needs to install and configure their own development environment independently, leading to significant environmental differences and high collaboration costs. Furthermore, testing environments often rely on expensive hardware equipment, making them difficult to scale flexibly or access remotely.

Although existing technologies, such as EP3889714A1 and U.S. Pat. No. 11,023,834B2, provide cloud-based collaborative development environments, they mainly focus on industrial automation design or workflow management, lacking dedicated support for the entire process of controller development, especially the seamless integration of virtual and physical testing.

To address the above issues, the present disclosure provides a system and a method for cloud-based collaborative development, aiming to solve the problems of large-scale testing environment requirements in conventional controller development and the inability to integrate testing systems from different software vendors.

SUMMARY

One objective of the present disclosure is to provide a system and a method for cloud-based collaborative development, providing an integrated, cloud-based multi-user development and testing system to address the difficulties of integrating tools and processes from multiple vendors.

Another objective of the present disclosure is to provide a system and a method for cloud-based collaborative development, allowing target hardware to provide customized functions through automated code generation mechanisms.

Yet another objective of the present disclosure is to provide a system and a method for cloud-based collaborative development, enabling developers to remotely access and perform hardware configuration, testing, software compilation, and verification of customized functions through centralized cloud resources and virtual HIL mechanisms.

A further objective of the present disclosure is to provide a system and a method for cloud-based collaborative development to achieve more efficient multi-party collaboration, resource allocation, and testing processes, while reducing development costs.

To achieve the above objectives, one aspect of the present disclosure provides a cloud-based collaborative development system, including an integrated development environment (IDE) cloud server, a resource dispatch module, a model database, a verification backend, and a data exchange bus. The IDE cloud server is configured to provide a user interface (UI) such that a remote device performs hardware specification settings, port configuration, and external module management through a remote browser or a client application. The resource dispatch module is configured to manage software resources and hardware resources and invoke the software resources and the hardware resources according to a schedule. The model database is configured to store models. The verification backend is configured to perform closed-loop verification based on the models stored in the model database. The data exchange bus is connected respectively to the IDE cloud server, the resource dispatch module, the model database, and the verification backend, and is configured to predefine extensible communication protocols and exchange data over Ethernet.

To achieve the above objectives, another aspect of the present disclosure provides a cloud-based collaborative development method, including the steps of: predefining extensible communication protocols and exchanging data over Ethernet; using a user interface (UI) to perform software development and parameter configuration; generating a software code based on the parameter configuration; compiling an executable file; writing a test case from a remote device through a remote browser or a client application; performing closed-loop verification on the executable file based on a model; and outputting a verification report and performing version management.

In summary, the cloud-based collaborative development system and method of the present disclosure enables development through a user interface, and combines containerization technology, dynamic resource allocation, and a structured data exchange bus to support real-time collaboration, integration of virtual and physical testing, and automated code generation. It addresses the issues of controller development requiring large-scale testing environments and the inability to integrate testing systems from different software vendors.

Those with ordinary skills in the technical field of the present disclosure, upon reviewing the following embodiments, can fully understand the central concepts, technical means adopted, and various implementation aspects of the present disclosure.

BRIEF DESCRIPTION OF THE DRA WINGS

The present disclosure will become more fully understood from the detailed description given herein below and the accompanying drawings which are given by way of illustration only, and thus are not limitative of the present disclosure and wherein.

DETAILED DESCRIPTION

To make the disclosure more detailed and complete, the following provides descriptive text for the embodiments and specific implementations of the present disclosure; however, the embodiments and specific implementations are not limited thereto.

Unless otherwise specified, the meanings of scientific and technical terms used in this specification are the same as those generally understood and commonly used by persons skilled in the technical field. Furthermore, the terms used herein encompass both singular and plural forms unless otherwise indicated.

Figure 1:
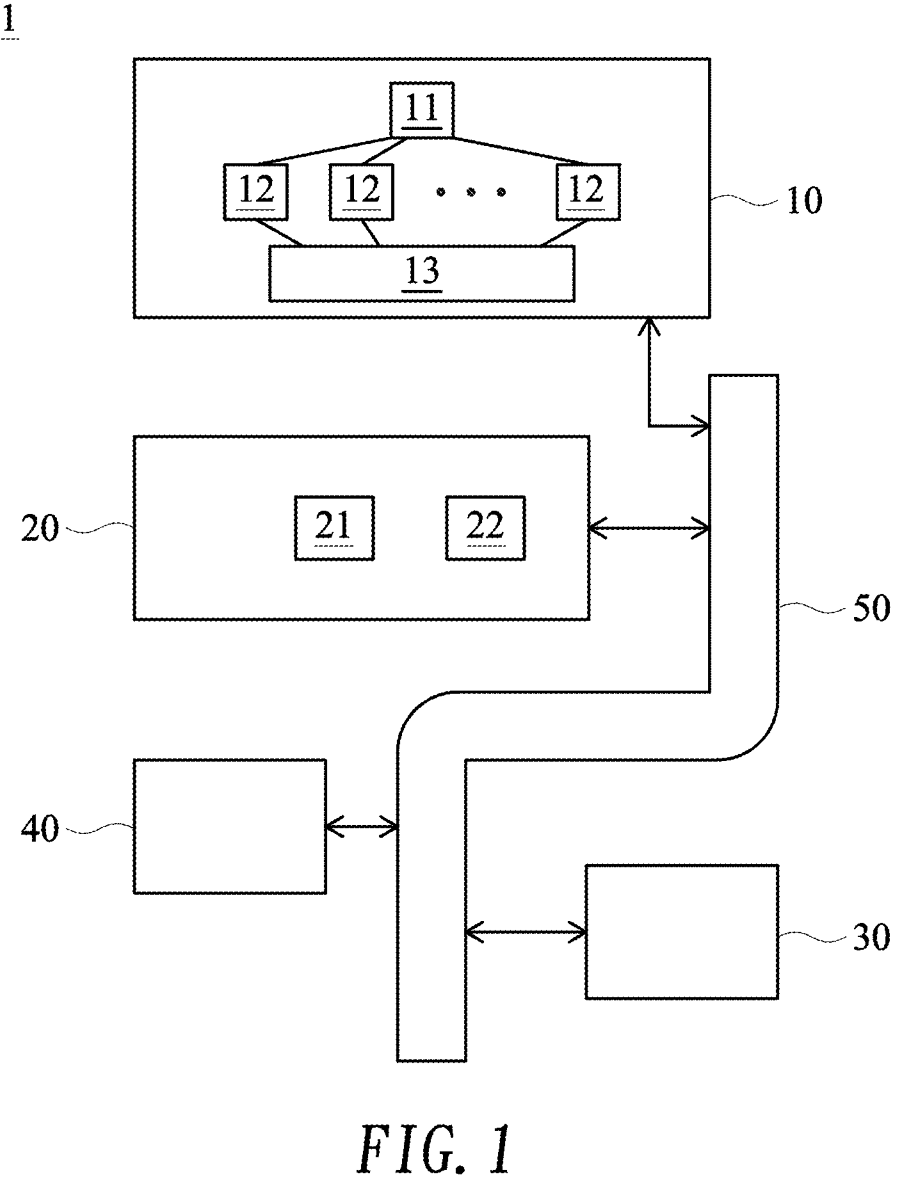
FIG. 1 is a schematic diagram of a cloud-based collaborative development system according to one embodiment of the present disclosure.

Please refer to FIG. 1, which is a schematic diagram of a cloud-based collaborative development system according to one embodiment of the present disclosure. In FIG. 1, the cloud-based collaborative development system 1 includes an integrated development environment (IDE) cloud server 10, a resource dispatch module 20, a model database 30, a verification backend 40, and a data exchange bus 50. The data exchange bus 50 is connected respectively to the IDE cloud server 10, the resource dispatch module 20, the model database 30, and the verification backend 40, and is configured to predefine extensible communication protocols and exchange data over Ethernet.

The IDE cloud server 10 is configured to provide a user interface (UI) 11 such that a remote device performs hardware specification settings, port configuration, and external module management through a remote browser or a client application. The user interface 11 may be a visual interface that supports visual hardware configuration, real-time multi-user collaboration, and version control. For example, the visual interface allows users to create and manage hardware topology in a graphical manner, such as configuring I/O modules, processor modules, memory modules, or communication modules through drag-and-drop, and setting up logical connections between modules, thereby quickly completing system architecture definition. In addition, the interface may also provide module property setting panels, port parameter editors, and inter-device dependency checking functions to assist users in making accurate settings and avoiding potential conflicts. Regarding multi-user collaboration, the IDE cloud server 10 further supports multiple users logging into the same project simultaneously for real-time collaboration. Users can view configuration changes made by others, make real-time comments, annotations, or provide feedback. The system can also display each collaborator's editing position and operation content in real-time, and supports change tracking and difference comparison, enabling team members to quickly understand the design evolution. If version conflicts occur, the system will prompt the relevant differences and provide merge strategy options to help the team maintain project consistency and ensure a smooth development process.

Furthermore, the IDE cloud server 10 further includes a plurality of software development tools 12, configured to run within a container 13. In other words, the system uses containerization technology to encapsulate required development resources into isolated container environments. Each container 13 can be pre-loaded with compilers, debuggers, code analysis tools, simulators, deployment tools, etc., and automatically constructs the corresponding software stack based on user selections. This containerization mechanism offers environmental isolation and re-deployability, effectively preventing common problems such as version conflicts, package dependency errors, and inconsistencies in development environments, thereby ensuring consistency and portability of the development environment for the project.

Furthermore, the IDE cloud server 10 also supports dynamic resource scheduling and automatic scaling mechanisms. When the container 13 detects high-intensity compilation or simulation tasks, the system can dynamically allocate additional CPU resources, memory capacity, and I/O bandwidth to the container in real-time, thereby improving development efficiency and shortening building time. When resource demand decreases, the system can release the resources for use by other containers, optimizing overall resource utilization. In addition, through a resource monitoring interface, system administrators or users can monitor the operational status, resource consumption trends, and bottleneck locations of each container 13 in real-time, further enhancing operation and maintenance performance and system reliability.

The resource dispatch module 20 is configured to manage software resources and hardware resources, and invoke the software resources and the hardware resources according to a schedule. The software resources include, for example, container execution environments, compilation resources, simulator execution units, debugging connection channels, etc. The hardware resources encompass available virtual devices, physical controllers, verification platforms, memory modules, I/O channels, etc. The resource dispatch module 20 ensures fair and efficient allocation and utilization of overall system resources in multi-user or multi-task environments.

The resource dispatch module 20 can receive task requests from the IDE cloud server 10, analyze them, and generate a scheduling plan based on the current availability of system resources and user priorities. For example, when multiple users simultaneously request to activate simulation verification platforms, the resource dispatch module 20 can, based on the scheduling strategy, allocate available simulation devices first and queue subsequent requests after the resources are released, to avoid resource contention or system deadlocks.

The resource dispatch module 20 includes a pipeline unit 21 configured to generate the schedule. The pipeline unit 21 can determine task priorities and allocate resources according to various scheduling algorithms, and can make adjustments based on user groups, task levels, or real-time load conditions.

In addition, the resource dispatch module 20 also includes a compiler 22 configured to compile firmware generated by the IDE cloud server 10 and produce corresponding executable files. The compiler 22 can automatically switch compiler cores and cross-compilation toolchains based on the target platforms (such as x86, ARM, RISC-V, etc.), support multi-language environments (such as C, C++, Python, Verilog, etc.), and integrate error checking, semantic analysis, and optimization procedures to ensure that the output firmware has good performance and correctness.

The model database 30 is configured to store models that provide verification, allowing users to perform closed-loop verification. The model database 30 provides structured storage and retrieval mechanisms, supporting the storage of models required for various simulation or physical verifications. The above models can be used to simulate system input conditions, interference sources, or feedback behaviors in actual operating environments, thereby interacting with control firmware to form closed-loop testing processes, simulating the overall performance and stability of the system in real application scenarios.

Figure 2:
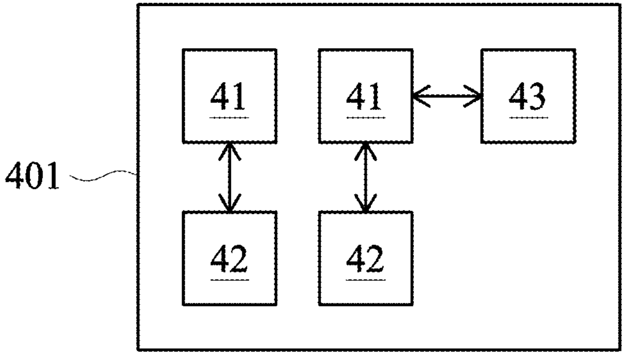
FIG. 2 is a schematic diagram of a verification backend of the cloud-based collaborative development system of FIG. 1, wherein the verification backend is a physical verification backend.
Figure 3:
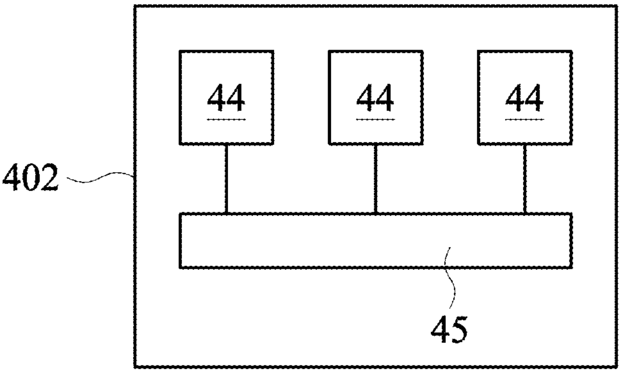
FIG. 3 is a schematic diagram of a verification backend of the cloud-based collaborative development system of FIG. 1, wherein the verification backend is a virtual verification backend.

The verification backend 40 is configured to perform closed-loop verification based on the models in the model database 30. The verification backend 40 may be a physical verification backend 401 (as shown in FIG. 2), a virtual verification backend 402 (as shown in FIG. 3), or a combination thereof, providing diverse verification methods to meet system testing requirements at different stages and in different application scenarios. Through the connection with the IDE cloud server 10, automated, repeatable, and traceable verification procedures can be achieved.

As shown in FIG. 2, in terms of physical verification, the physical verification backend 401 includes a physical controller 41, a hardware-in-the-loop (HIL) device 42, and a programmer 43. The physical controller 41 is configured to load and execute the firmware compiled and generated by the IDE cloud server 10. The physical controller 41 supports multiple peripheral connections, such as general-purpose input/output (GPIO), analog-to-digital converters (ADC), communication interfaces (SPI, $I^2C$, CAN, Ethernet), etc., to simulate operations in actual application scenarios. The HIL device 42 is configured to simulate external physical devices and environmental conditions, receiving control signals output by the physical controller 41 and immediately feeding back simulated environmental responses to the physical controller 41, forming a complete control closed-loop. The closed-loop verification process of the physical verification backend 401 includes using the programmer 43 to burn the executable file into the physical controller 41 and performing simulation tests using the HIL device 42. The programmer 43 automatically selects appropriate timing and equipment resources for burning tasks according to the schedule generated by the resource dispatch module 20. After burning is complete, the physical controller 41 enters the execution status, operating the verification scenario with the HIL device 42, and returning the execution results to the cloud backend for recording and visualization. The physical verification backend 401 also supports multi-user collaboration, allowing multiple users to view current control logic configurations, HIL testing status, and burning records within the same project through the user interface 11. Users can annotate, compare versions, and make real-time modifications to the control logic configured by others, and can control collaborative processes according to user permission settings, such as verification case review, result review, and approval, ensuring team operation consistency and change traceability.

In contrast, as shown in FIG. 3, the virtual verification backend 402 is configured to provide a virtual controller 44 and a virtual platform 45 to execute the firmware generated by the IDE cloud server 10. The virtual controller 44 may be a virtual machine or simulator that simulates the behavior of a real chip, supporting standard embedded instruction set architectures, and simulating the behaviors of components such as internal registers, counters, interrupt handlers, and peripheral modules. The virtual platform 45 simulates system-level operating environments and interactions with external devices, capable of simulating signal flows, event sequences, and timing responses of I/O operations. The closed-loop verification process of the virtual verification backend 402 includes loading the generated executable file into the virtual platform 45 and executing simulation test cases through software-in-the-loop (SIL) module. The SIL module may be purely software-based (for example, by component functions implemented in Python/C++) or hybridized with FPGA or other hardware acceleration resources to improve simulation accuracy. The virtual verification backend 402 also supports multi-user login and verification analysis functions, allowing developers to simultaneously view the execution status of each virtual controller 44, simulation outputs, and verification reports in the project view, as well as to annotate and discuss errors in real time, improving development efficiency and team collaboration.

In summary, the verification backend 40 of this system features both physical and virtual functionalities and is tightly integrated with the integrated development environment. It not only supports various controller architectures and environmental simulations but also achieves a highly scalable and reliable verification mechanism through modular design and the data exchange bus 50, ensuring integration quality and operational consistency between software and hardware during the development of control systems, while also supporting real-time collaboration and traceability of verification data, significantly improving development efficiency and quality control capabilities.

Notably, the data exchange bus 50 is configured as a data transmission and message coordination channel between the core modules of the cloud-based collaborative development system 1 of the present disclosure. It adopts predefined and extensible communication protocols to achieve an efficient, synchronized, and scalable data exchange mechanism between modules. The data exchange bus 50 is primarily based on the Ethernet protocol, supporting high bandwidth and low latency characteristics, and incorporates time sensitive networking (TSN) technology at the data link layer to provide time synchronization and traffic control capabilities, ensuring temporal consistency required for real-time control and verification in complex systems.

The application layer of the data exchange bus 50 is designed in a structured packets format to describe the data content and its source model architecture. All packets are embedded with high-precision timestamps to ensure consistent event triggering and data synchronization among modules.

The data exchange bus 50 is respectively connected to key modules such as the IDE cloud server 10, the resource dispatch module 20, the model database 30, and the verification backend 40, forming a complete closed data transmission loop. Each module exchanges control commands, firmware version information, model definitions, verification results, and resource usage status through a unified communication protocol, enabling collaborative operation and workflow automation between modules. The data exchange bus 50 supports bidirectional real-time communication and includes status query and result return mechanisms, which can be used to trigger verification tasks, update model definitions, or monitor verification progress in real time.

To enhance the integration capabilities across protocols and heterogeneous systems, the data exchange bus 50 is also configured with a service bridge interface (not shown), which converts and encapsulates non-Ethernet signals such as traditional industrial protocols like CAN (controller area network), UART (universal asynchronous receiver transmitter), LIN (local interconnect network), etc., enabling them to be synchronously transmitted through the Ethernet-compatible data exchange bus 50. The bridge supports bidirectional packet encapsulation and decapsulation, signal rate conversion, packet reassembly, and error checking mechanisms for different protocols, and allows multiple bridges to operate concurrently to ensure signal conversion efficiency and stability in multi-node environments.

The data exchange bus 50 also includes a data model transformation interface (not shown) for integration with existing controller modeling formats or verification models, providing compatibility and translation capabilities. For example, it supports automatic conversion of user-uploaded functional mock-up unit (FMU) models into structured message formats used internally, achieving data consistency across vendors and development platforms. This transformation interface performs mapping and management of models versions and structure definitions based on the data model ID and schema version. It automatically performs structure matching and field mapping when models from different sources or versions exist in the system, thereby avoiding data inconsistency or format error issues.

Furthermore, the data exchange bus 50 supports flexible communication modes. On one hand, it provides a request/response mechanism for status queries, command control, and synchronous verification. On the other hand, it also supports a publish/subscribe mode to actively push notifications of important events or data changes, avoiding overloading of the centralized controller and facilitating real-time broadcasting and rapid distribution of real-time data. The system can adopt unicast or broadcast modes according to application requirements, implementing high-efficiency control and synchronization in multi-node network topologies.

The data exchange bus 50 can also serve as the backbone for cross-system integration. Together with the service bridge and data model transformation interface, it enables the integration and interoperability of multi-source, multi-vendor controller development platforms. For example, developers can model a virtual controller of one brand and, through the exchange bus, deploy the control logic to another platform for SIL verification, or return the verification results to the original model database for version management and correction.

In summary, the data exchange bus 50 serves as a high-performance, scalable, and collaborative information backbone for the cloud-based collaborative development system 1 of the present disclosure. Through time synchronization, protocol conversion, model integration, and flexible communication mechanisms, it achieves high-level integration and collaboration across modules, vendors, and platforms, making it one of the key technological cores of the system of the present disclosure.

Figure 4:
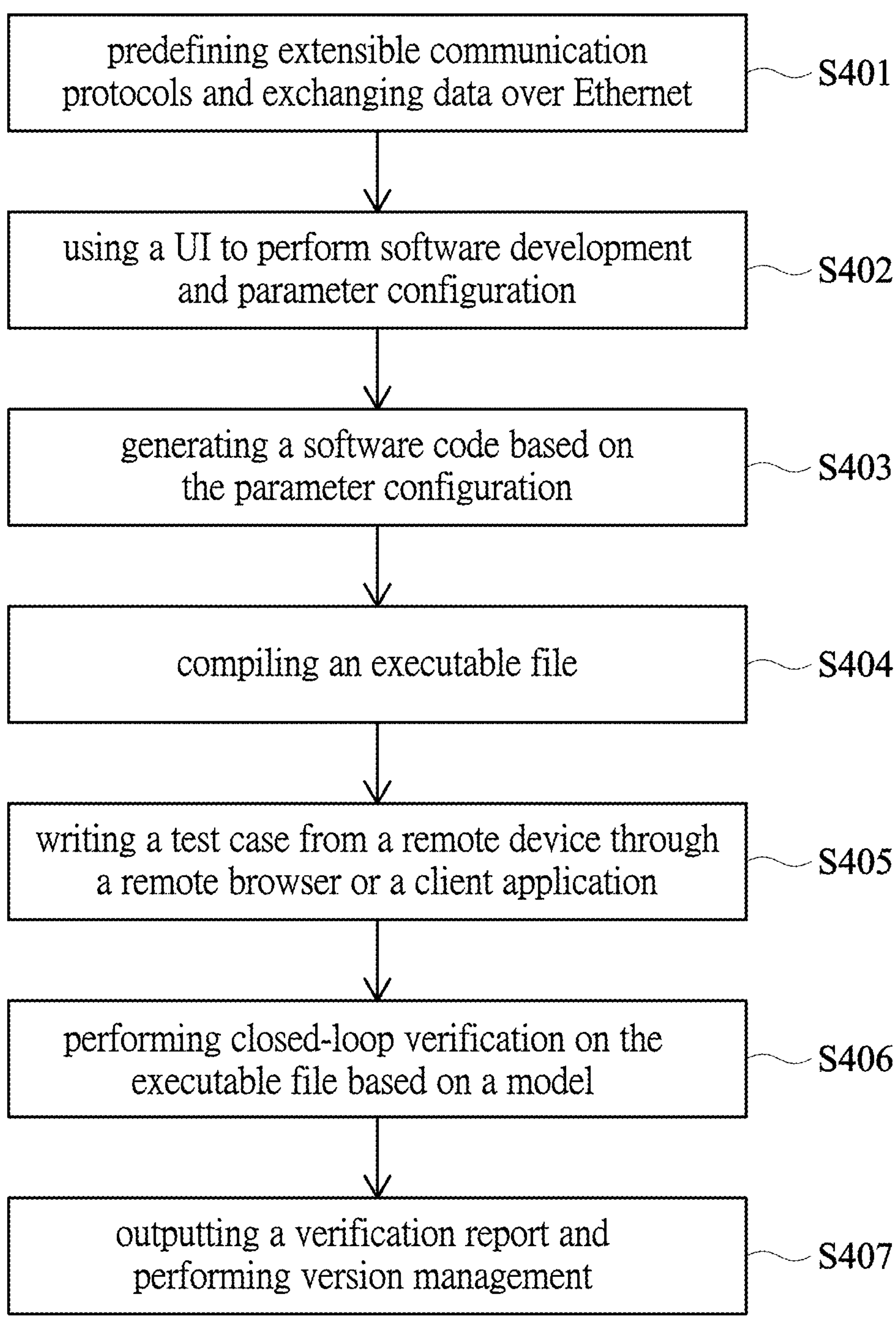
FIG. 4 is a flowchart of a cloud-based collaborative development method according to one embodiment of the present disclosure.

In conjunction with the above-described cloud-based collaborative development system 1, another aspect of the present disclosure provides a cloud-based collaborative development method, which, as shown in FIG. 4, includes the following steps.

First, in Step S401, extensible communication protocols are predefined. These communication protocols are based on the Ethernet protocols and feature time synchronization and traffic control capabilities, utilizing, for example, time sensitive networking (TSN) technology to ensure real-time and synchronized data transmission between modules within the system. The communication protocols support structured packets formats and include fields such as data model version, data source and destination, timestamp, etc., thereby providing consistent and traceable data interaction standards among modules.

In Step S402, a user interface (UI) is used for software development and parameter configuration. The UI may be a graphical and visual operation interface that supports controller pin settings, external module configurations, communication protocol parameter adjustments, and other functions. This UI also supports multi-user real-time collaboration mode, allowing multiple users to simultaneously perform project design operations, and provides real-time change notifications, annotation messages, difference comparisons, and rollback operations to enhance team collaboration efficiency. All configuration results by users can be automatically synchronized to the cloud server and communicated with other modules through the data exchange bus 50.

In step S403, a software code is generated based on the parameter configuration. The software code may include module initialization, communication protocol drivers, I/O control logic, timer configurations, etc., and according to the requirements of the target platform corresponding to the controller, supports output in cross-platform languages and architectures, such as C, C++, Python, or other compatible controller architectures. The code generation process also automatically constructs code documentation and module dependency diagrams for future development and maintenance reference.

In Step S404, an executable file is compiled. This involves compiling the generated software code to produce the corresponding executable file. The compilation process is executed in the container 13 of the IDE cloud server 10, and the resource dispatch module 20 automatically allocates the necessary processing resources and memory space.

In Step S405, test cases are written from a remote device through a remote browser or a client application. Users can write test cases using a remote browser or a dedicated application. The test cases may be created using a graphical flow editor or scripting languages, and their content includes simulated inputs, expected outputs, fault-tolerance boundaries, and test time ranges. Users may also invoke previously created models for binding tests, which can be stored in the database for subsequent invocation and version management.

In Step S406, based on the models stored in the model database 30, closed-loop verification is performed on the generated executable file. The verification backend 40 may be a physical verification backend 401 or a virtual verification backend 402 or a combination thereof.

In Step S407, the verification backend 40 generates a verification report based on the test results. The report includes the executable file version, test case details, model references, pass/fail statistics, failure records, test time, and verification platform information. The verification report can be output in structured formats such as PDF, HTML, or JSON and uploaded to the IDE cloud server 10 for version management and report comparison, and may be used for quality review and project traceability.

In summary, the cloud-based collaborative development system and method of the present disclosure enables development through a user interface, and combines containerization technology, dynamic resource allocation, and a structured data exchange bus to support real-time collaboration, integration of virtual and physical testing, and automated code generation. It addresses the issues of controller development requiring large-scale testing environments and the inability to integrate testing systems from different software vendors.

While the disclosure has been described in terms of what is presently considered to be the most practical and preferred embodiments, it is to be understood that the disclosure need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cloud-based collaborative development system, comprising:

an integrated development environment (IDE) cloud server, configured to provide a user interface such that a remote device performs hardware specification settings, port configuration, and external module management through a remote browser or a client application;

a resource dispatch module, configured to manage software resources and hardware resources and invoke the software resources and the hardware resources according to a schedule;

a model database, configured to store models;

a verification backend, configured to perform closed-loop verification based on the models stored in the model database, comprising a physical controller, a hardware-in-the-loop (HIL) device, and a programmer, wherein the physical controller is configured to physically execute software, the HIL device is configured to test a firmware generated by the IDE cloud server, and the programmer is configured to perform firmware updates according to the schedule from the resource dispatch module; and a data exchange bus, connected respectively to the IDE cloud server, the resource dispatch module, the model database, and the verification backend, and configured to predefine extensible communication protocols and exchange data over Ethernet, wherein the data exchange bus comprises a service bridge interface configured to convert non-Ethernet signals into Ethernet signals;

wherein the verification backend is a combination of the physical verification backend and a virtual verification backend, the virtual verification backend being configured to provide a virtual controller and a virtual platform to execute the firmware generated by the IDE cloud server.

2. The cloud-based collaborative development system of claim 1, wherein the IDE cloud server comprises a plurality of software development tools configured to run within a container.

3. The cloud-based collaborative development system of claim 1, wherein the resource dispatch module comprises a pipeline unit configured to generate the schedule.

4. The cloud-based collaborative development system of claim 1, wherein the resource dispatch module comprises a compiler configured to compile a firmware generated by the IDE cloud server and produce corresponding executable files.

5. The cloud-based collaborative development system of claim 1, wherein the verification backend is a virtual verification backend configured to provide a virtual controller and a virtual platform to execute a firmware generated by the IDE cloud server.

6. The cloud-based collaborative development system of claim 1, wherein the data exchange bus has an application layer that uses structured packets and synchronized timestamps.

* * * * *